United States Patent
Peterson et al.

(10) Patent No.: US 7,210,792 B2
(45) Date of Patent: May 1, 2007

(54) PROJECTION SYSTEM AND METHOD

(75) Inventors: Charles M. Peterson, Sammamish, WA (US); Gene Koch, Bayville, NJ (US)

(73) Assignee: Arisawa Manufacturing Co., Ltd (JP)

( * ) Notice: Subject to any disclaimer, the term of this patent is extended or adjusted under 35 U.S.C. 154(b) by 165 days.

(21) Appl. No.: 10/997,999

(22) Filed: Nov. 29, 2004

(65) Prior Publication Data

US 2006/0114419 A1    Jun. 1, 2006

(51) Int. Cl.
*G03B 21/14* (2006.01)
*G03B 21/56* (2006.01)

(52) U.S. Cl. .................................. 353/79; 359/443

(58) Field of Classification Search ............... 353/77, 353/79; 359/453, 460, 443, 449, 202, 204
See application file for complete search history.

(56) References Cited

U.S. PATENT DOCUMENTS

| | | | | |
|---|---|---|---|---|
| 2001/0019240 A1* | 9/2001 | Takahashi | .................... | 313/483 |
| 2002/0122260 A1* | 9/2002 | Okazaki et al. | ............. | 359/636 |
| 2004/0135495 A1 | 7/2004 | Wu et al. | | |
| 2006/0209403 A1* | 9/2006 | Parusel et al. | ............... | 359/453 |

* cited by examiner

*Primary Examiner*—Melissa Jan Koval
*Assistant Examiner*—Andrew Kong
(74) *Attorney, Agent, or Firm*—Ronald D. Trice

(57) ABSTRACT

A micromechanical mirror combined with a photoluminescent screen is able to efficiently use light from the light source. In such a device, the light source produces light that is directed onto the micromechanical mirror. The micromechanical mirror then selectively reflects the light onto a photoluminescent screen. The light excites the photoluminescent screen to produce the desired picture. The photoluminescent screen may include sets of pixels that convert light from the light source to provide the desired picture. Typically, each pixel set includes a red, green and blue portion although any suitable combination of colors and number of pixels may be used. Each pixel set portion converts the light received from the light source into its respective color by photoluminescence. Alternatively, the photoluminescent screen may include transparent and/or scattering portions instead of photoluminescent portions of a certain color when the light source has a spectrum which is limited to one color.

31 Claims, 4 Drawing Sheets

PROJECTION SYSTEM AND METHOD

FIELD OF THE INVENTION

The present invention relates generally to projection system and method, and more particularly, to projection system including a micromechanical mirror and a photoluminescent screen and method.

BACKGROUND

A projection system having a micromechanical mirror and a single light source only uses a small fraction of the light generated by its light source despite the extremely low loss transfer function of the micromechanical mirror. This is due to the use of a color wheel or other color filter elements which filter out a large portion of the generated light. Accordingly, there is a strong need in the art for projection system and method including a micromechanical mirror that is able to efficiently utilize the light from its light.

SUMMARY OF THE INVENTION

An aspect of the present invention is to provide a projection device including a photoluminescent screen, a micromechanical mirror and a light source.

Another aspect of the present invention is to provide a projection method including generating light, selectively reflecting the light to a screen with a micromechanical mirror to form selectively reflected light and generating an image from the selectively reflected light. The at least part of the selectively reflected light is converted to the image by photoluminescence.

BRIEF DESCRIPTION OF THE DRAWINGS

The invention will be described in detail with reference to the following drawings in which like reference numerals refer to like elements wherein.

DETAILED DESCRIPTION

A micromechanical mirror in combination with a photoluminescent screen is able to more fully the light from the light source since there is no need to filter the light source with a color wheel or the like. In such a device, the light source produces light that is directed onto the micromechanical mirror. The micromechanical mirror then selectively reflects the light onto a photoluminescent screen. The light excites the photoluminescent screen to produce the desired picture. The photoluminescent screen may include sets of pixels that convert light from the light source to provide the desired picture. Typically, each pixel set includes a red, green and blue portion although any suitable combination of colors and number of pixels may be used. Each pixel set portion converts the light received from the light source into its respective color by photoluminescence. Alternatively, the photoluminescent screen may include transparent and/or scattering portions instead of photoluminescent portions of a certain color when the light source has a spectrum which is limited to one color.

Figure 1:
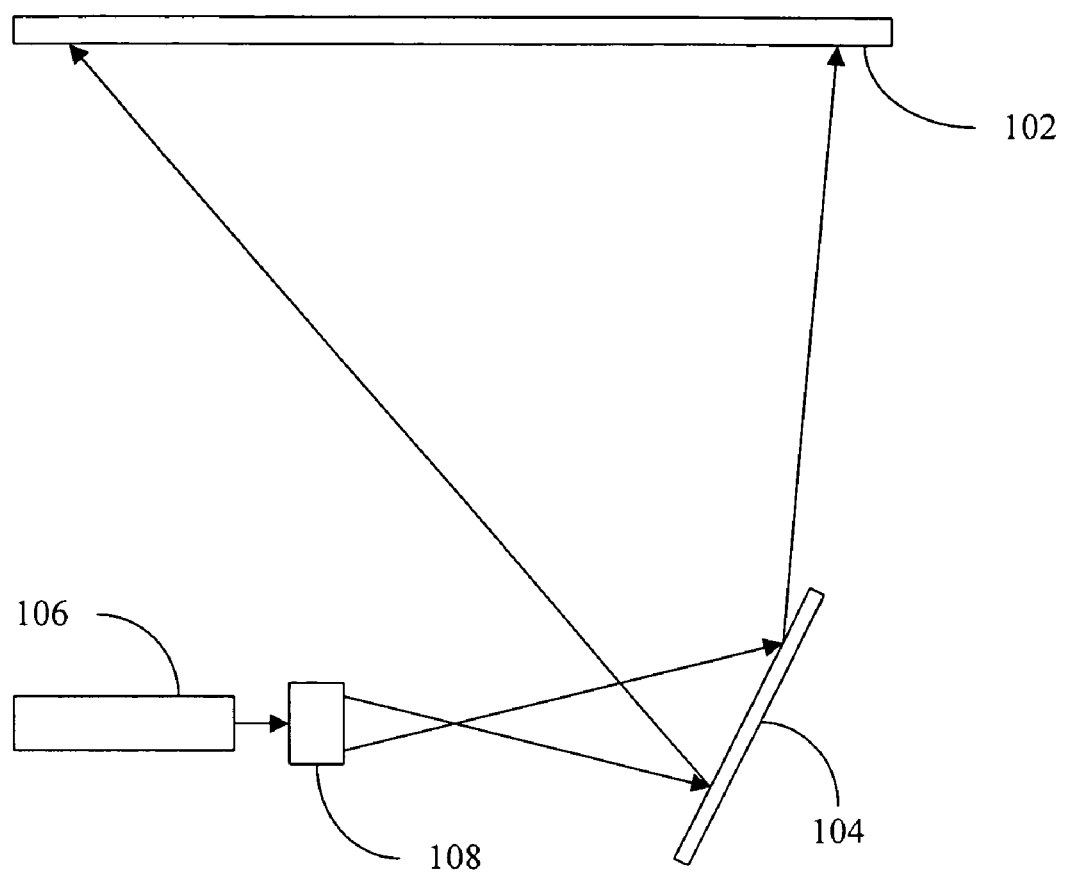
FIG. 1 illustrates projection system having a photoluminescent screen, a micromechanical mirror and a light source.

FIG. 1 illustrates projection system 100 having a photoluminescent screen 102, a micromechanical mirror 104 and a light source 106. The light source 106 may be any suitable light source. However, light sources with narrow band emission spectrums are advantageous since the photoluminescent materials of the photoluminescent screen 102 may be selected such that the emission peak of the light source 106 corresponds to the most efficient conversion frequency of the photoluminescent materials of the photoluminescent screen 102. Such a narrow band emission light source may provide light at a single frequency. For example, a blue laser light source may be used.

The light from the light source 106 may be input into an optical system 108 for projection onto the micromechanical mirror 104. The micromechanical mirror 104 then selectively reflects the light from the light source 106 such that a monochromatic image is projected onto the photoluminescent screen 102. The photoluminescent screen 102 then produces a chromatic image by photoluminescence.

For example, a blue laser is used to illuminate a micromechanical mirror 104 that selectively modulates the laser light to encode red, blue and green images within a single monochromatic image. The single monochromatic image is decoded by the photoluminescent materials of the photoluminescent screen 102 to form the chromatic image.

Figure 2:
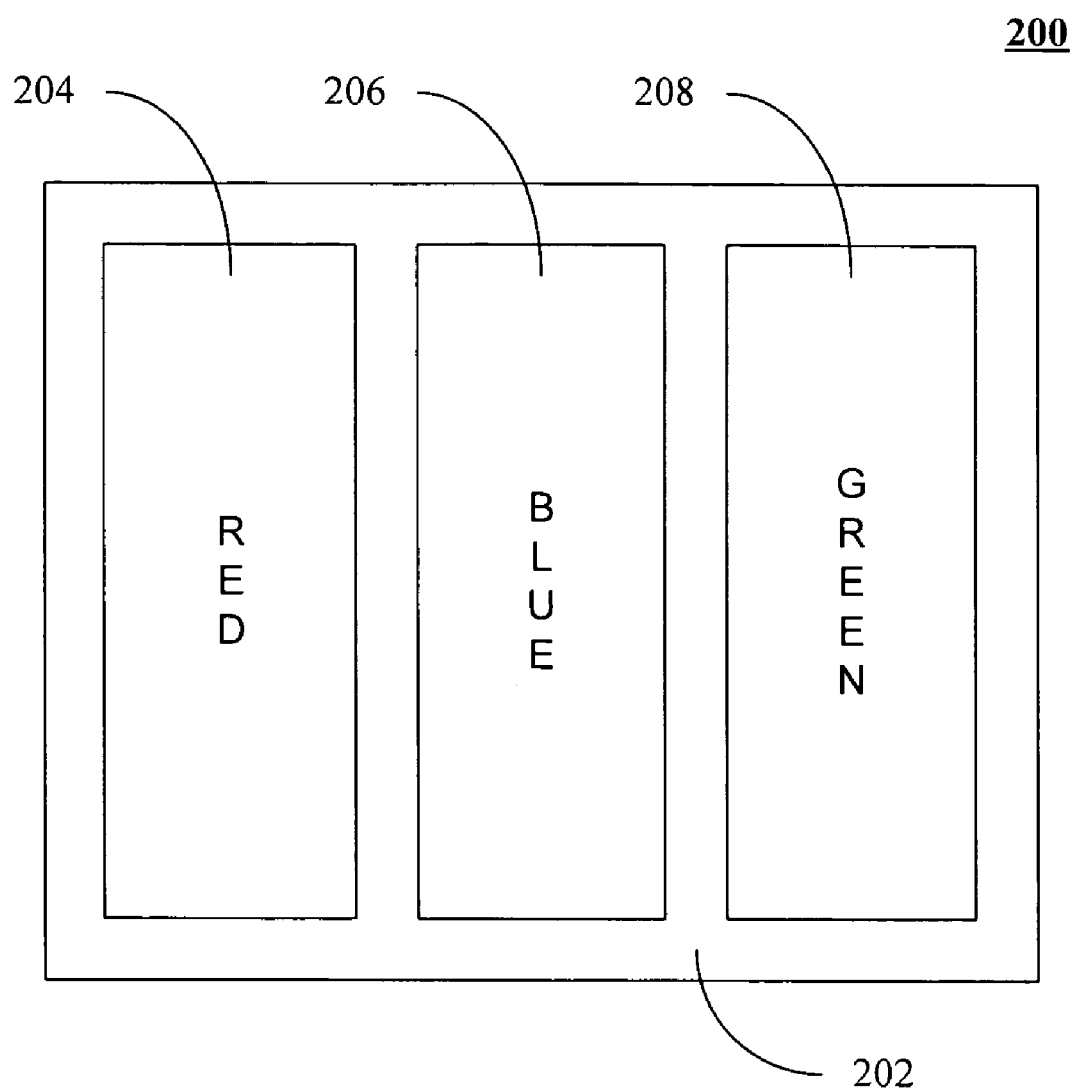
FIG. 2 illustrates an exemplary top view of a simple pixel set structure with a black matrix and one red pixel, one blue pixel and one green pixel.

The photoluminescent screen 102 includes a plurality of pixel sets (e.g., a pixel set of one red pixel, one blue pixel and one green pixel). The pixels of the pixels sets may be of any suitable shape and size, may include one or more pixels of a particular color, may include one or more white pixels, may have different numbers of pixels for different pixel colors, and may be used to provide grayscale. None, some or all of the pixels of a pixel set may be separated by a black matrix. Additionally, the pixel set itself may be framed by a black matrix. For example, FIG. 2 illustrates an exemplary top view of a simple pixel set structure 200 with a black matrix 202 and one red pixel 204, one blue pixel 206 and one green pixel 208. The black matrix 202 of FIG. 2 both frames the pixel set 200 from adjacent pixel sets and separates the individual pixels 204, 206, 208 from each other.

Figure 3:
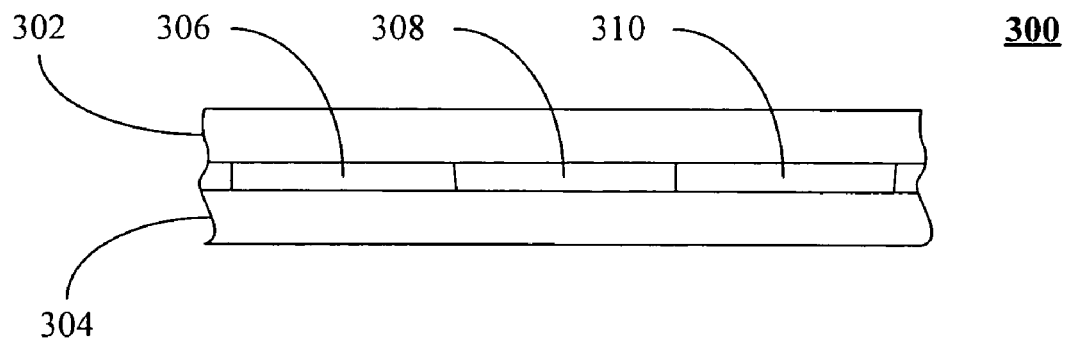
FIG. 3 illustrates a side view of an exemplary pixel set structure of the photoluminescent screen.

FIG. 3 illustrates a side view of an exemplary pixel set structure 300 of the photoluminescent screen 102. The pixel set structure 300 of this figure includes a top plate 302, a bottom plate 304, a first primary color photoluminescent material 306, a second primary color photoluminescent material 308 and a third primary color photoluminescent material 310. Exemplary primary colors would be red, green and blue. The top plate 302 may be a simple glass or polymer substrate (e.g., PMMA, PET and any other suitable polymer substrates) or may be a more complex element that includes light scattering structures, light absorbing structures, antireflective layers, polarizers and other layers and structures usable with projections screens. It is advantageous to have the photoluminescent material 306, 308, 310 that emit polarized light when a polarizer is included in the top plate 302 so as to reduce undesirable absorption of the light emitted by the photoluminescent materials 306, 308, 310. Exemplary photoluminescent materials and methods of deposition, including those that emit polarized light, may be found in published U.S. applications 2003/0,119,936, 2003/

0,099,862 and 2003/0,099,785, which are incorporated herein by reference. Alternatively, inkjet printing may be used for deposition of materials. The bottom plate 304 may be a simple glass or polymer substrate (e.g., PMMA, PET and any other suitable polymer substrates) or may be a more complex element that includes light scattering structures, light absorbing structures, antireflective layers, polarizers and other layers and structures usable with projections screens.

Figure 4:
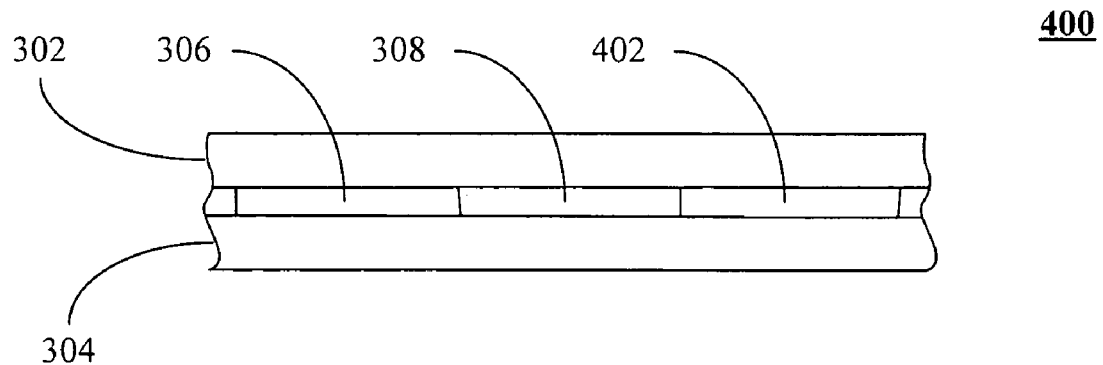
FIG. 4 illustrates a side view of another exemplary pixel set structure of the photoluminescent screen.

FIG. 4 illustrates a side view of another exemplary pixel set structure 400 of the photoluminescent screen 102. The pixel set structure 400 of this figure includes a top plate 302, a bottom plate 304, a first primary color photoluminescent material 306 and a second primary color photoluminescent material 308. A third primary color may be provided by directly using the light from the light source 106. This direct light source utilization element 402 may be empty space, clear material, light scattering material or any other suitable element that allows passage of light from the light source 106. Because the light passes through the direct light source utilization element 402 without any of the losses associated with photoluminescent light conversion, the size of this pixel may be slightly reduced.

Figure 5:
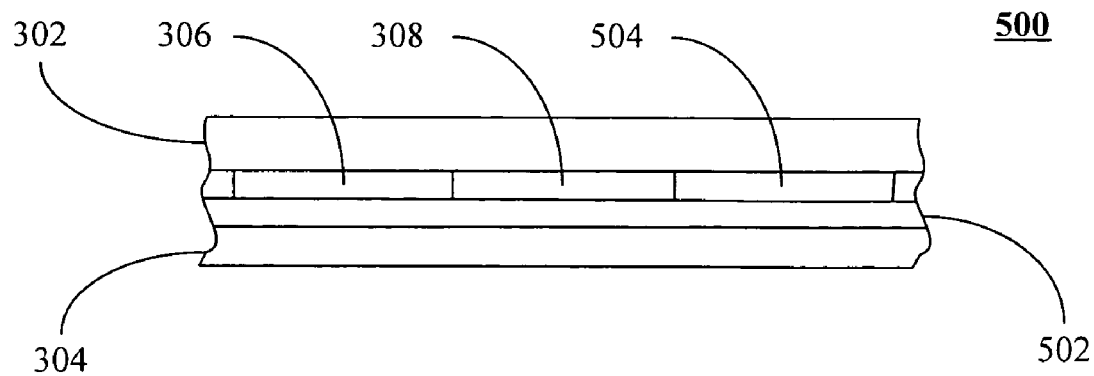
FIG. 5 illustrates a side view of third exemplary pixel set structure of the photoluminescent screen.

FIG. 5 illustrates a side view of third exemplary pixel set structure 500 of the photoluminescent screen 102. The pixel set structure 500 of this figure includes a top plate 302, a bottom plate 304, a first primary color photoluminescent material 306 and a second primary color photoluminescent material 308. A third photoluminescent material 502 is formed as a continuous layer under the first primary color photoluminescent material 306, the second primary color photoluminescent material 308 and a remaining element 504. The third photoluminescent material 502 may be a third primary color photoluminescent material coverts all of the light from the light source 106 into the third primary color by photoluminescence. In this case, the first and second primary color photoluminescent materials 306, 308 then convert the third primary color of light into their respective primary colors by photoluminescence and the remaining element 504 may be a direct utilization element that allows passage of light from the third photoluminescent material 502. This direct light source utilization element may be empty space, clear material, light scattering material, additional third photoluminescent material or any other suitable element that allows passage of light from the third photoluminescent material 502. This is advantageous because the light from the light source 106 may be selected from any suitable wavelength or wavelengths of light not just the third primary color of light. For example, ultraviolet light may be used. Alternatively, the third photoluminescent material 502 may convert to an wavelength or wavelengths of light that may be efficiently used by the first and second primary color photoluminescent materials 306, 308 and a third primary color photoluminescent material that forms the remaining element 504.

Figure 6:
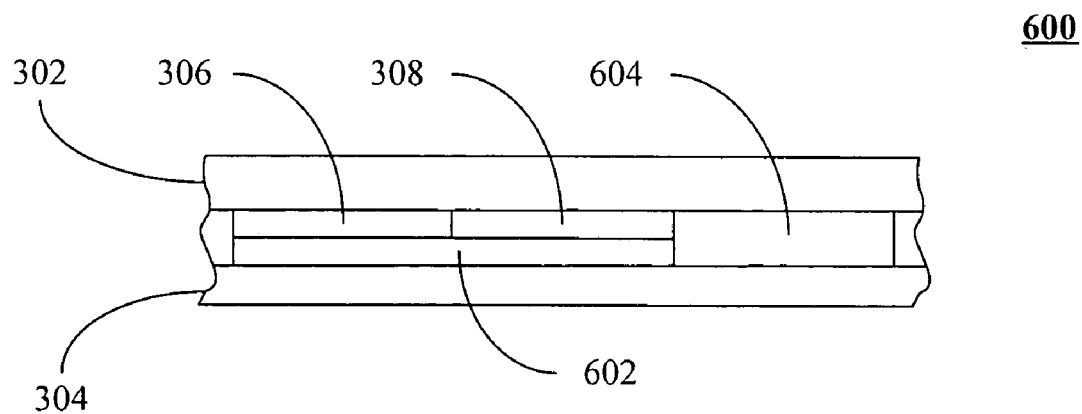
FIG. 6 illustrates a side view of fourth exemplary pixel set structure 600 of the photoluminescent screen.

FIG. 6 illustrates a side view of fourth exemplary pixel set structure 600 of the photoluminescent screen 102. The pixel set structure 600 of this figure includes a top plate 302, a bottom plate 304, a first primary color photoluminescent material 306 and a second primary color photoluminescent material 308. A third photoluminescent material 602 is formed as a continuous layer under the first and second primary color photoluminescent materials 306, 308. The third photoluminescent material 602 converts the light from the light source 106, which corresponds to a third primary color, into the wavelength or wavelengths of light that are more efficiently converted by the first and second primary color photoluminescent materials 306, 308. Lastly, a direct light source utilization element 604 allows passage of light from the light source 106. This direct light source utilization element 604 may be empty space, clear material, light scattering material, or any other suitable element that allows passage of light from the light source 106. Because the light passes through the direct light source utilization element 604 without any of the losses associated with photoluminescent light conversion, the size of this pixel may be slightly reduced. Additionally, the third photoluminescent material 602 allows great latitude in the selection of the first and second primary color photoluminescent materials 306, 308 and/or greater conversion efficiency.

An alternative configuration of FIG. 6 uses a third primary color photoluminescent material for the direct light source utilization element 604 and the light source 106 may have any advantageous spectrum.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

We claim:

1. A projection device comprising:
   a photoluminescent screen;
   a micromechanical mirror; and
   a light source,
   wherein
   the photo luminescent screen has a plurality of pixel sets;
   each pixel set includes a first primary color photoluminescent material and a second primary color photoluminescent material; and
   the first primary color photoluminescent material and the second primary color photoluminescent material are disposed in substantially a same plane and formed on another photoluminescent material.

2. The device of claim 1, wherein the light source is a monochromatic light source.

3. The device of claim 1, wherein the light source produces blue light.

4. The device of claim 1, wherein the light source is a laser.

5. The device of claim 1, wherein each pixel set has a first area that generates a first primary color, a second area that generates a second primary color and a third area that generates a third primary color.

6. The device of claim 5, wherein
   the first area generates the first primary color by photoluminescence, and
   the second area generates the second primary color by photoluminescence.

7. The device of claim 6, wherein the third area generates the third primary color by photoluminescence.

8. The device of claim 6, wherein the third area generates the third primary color by transmitting or scattering light.

9. The device of claim 6, wherein the third area generates the third primary color by transmitting or scattering light without using photoluminescence.

10. The device of claim 7, wherein the another photoluminescent material generates the third primary color by photoluminescence.

11. The device of claim 1, wherein each pixel set further includes a third primary color photoluminescent material.

12. The device of claim 11, wherein the first primary color photoluminescent material, the second primary color photoluminescent material and the third primary color photoluminescent material are in the same plane.

13. The device of claim 11, wherein the first primary color photoluminescent material and the second primary color photoluminescent material are in the same plane.

14. The device of claim 1, wherein the light source is a blue laser.

15. The device of claim 1, wherein the photoluminescent screen further includes a black matrix.

16. A projection method comprising:
generating light;
selectively reflecting the light to a screen with a micromechanical mirror to form selectively reflected light; and
generating an image from the selectively reflected light, wherein
at least part of the selectively reflected light is converted to the image by photoluminescence;
the screen has a plurality of pixel sets;
each pixel set includes a first primary color photoluminescent material and a second primary color photoluminescent material; and
the first primary color photoluminescent material and the second primary color photoluminescent material are disposed in substantially a same plane and formed on another photoluminescent material.

17. The method of claim 16, wherein the light is monochromatic.

18. The method of claim 16, wherein the light is blue light.

19. The method of claim 16, wherein the light is generated by a laser.

20. The method of claim 16, wherein each pixel set has a first area that generates a first primary color, a second area that generates a second primary color and a third area that generates a third primary color.

21. The method of claim 20, wherein the first area generates the first primary color by photoluminescence and the second area generates the second primary color by photoluminescence.

22. The method of claim 21, wherein the third area generates the third primary color by photoluminescence.

23. The method of claim 21, wherein the third area generates the third primary color by transmitting or scattering light without using photoluminescence.

24. The method of claim 22, wherein the third area generates the third primary color by transmitting or scattering light.

25. The method of claim 22, wherein the another photoluminescent material generates the third primary color by photoluminescence.

26. The method of claim 16, wherein each pixel set further includes a third primary color photoluminescent material.

27. The method of claim 26, wherein the first primary color photoluminescent material, the second primary color photoluminescent material and the third primary color photoluminescent material are in the same plane.

28. The method of claim 26, wherein the first primary color photoluminescent material and the second primary color photoluminescent material are in the same plane.

29. The method of claim 16, wherein the light is generated by a blue laser.

30. The method of claim 16, wherein the screen further includes a black matrix.

31. A projection method comprising:
generating light;
selectively reflecting the light to a screen with a micromechanical mirror to form selectively reflected light; and
generating an image from the selectively reflected light, wherein
at least part of the selectively reflected light is converted to the image by photoluminescence;
the screen has a plurality of pixel sets;
each pixel set has a first primary color photoluminescent material, a second primary color photoluminescent material and a third primary color photoluminescent material;
the first primary color photoluminescent material and the second primary color photoluminescent material are in the same plane;
the third primary color photoluminescent material is in a different plane than the first primary color photoluminescent material and the second primary color photoluminescent material;
the third primary color photoluminescent material generates a monochromatic sub-image from the selectively reflected light by photoluminescence; and
the first primary color photoluminescent material and the second primary color photoluminescent material convert part of the monochromatic sub-image into the image by photoluminescence.

\* \* \* \* \*